United States Patent
Wicks et al.

(10) Patent No.: US 11,667,732 B2
(45) Date of Patent: Jun. 6, 2023

(54) REACTIVE CARBONATE FOR ELASTOMERIC ARTICLES

(71) Applicant: IMERYS USA, INC., Roswell, GA (US)

(72) Inventors: Douglas Wicks, Johns Creek, GA (US); Kalena Stovall, Atlanta, GA (US); Sang Jin Park, Daejeon (KR); Virenda Singh, Cumming, GA (US)

(73) Assignee: Imerys USA, Inc., Roswell, GA (US)

( * ) Notice: Subject to any disclaimer, the term of this patent is extended or adjusted under 35 U.S.C. 154(b) by 252 days.

(21) Appl. No.: 16/755,330

(22) PCT Filed: Oct. 10, 2018

(86) PCT No.: PCT/US2018/055162
§ 371 (c)(1),
(2) Date: Apr. 10, 2020

(87) PCT Pub. No.: WO2019/075021
PCT Pub. Date: Apr. 18, 2019

(65) Prior Publication Data
US 2020/0308318 A1    Oct. 1, 2020

Related U.S. Application Data

(60) Provisional application No. 62/571,035, filed on Oct. 11, 2017.

(51) Int. Cl.
C08F 8/44 (2006.01)
C08C 19/28 (2006.01)
C08K 3/26 (2006.01)

(52) U.S. Cl.
CPC ............. C08F 8/44 (2013.01); C08C 19/28 (2013.01); C08K 3/26 (2013.01); *C08K 2003/265* (2013.01)

(58) Field of Classification Search
CPC ...... C08K 9/08; C08K 2003/265; C08K 3/26; C09C 1/021; C08C 19/28; C08F 8/44
See application file for complete search history.

(56) References Cited

U.S. PATENT DOCUMENTS

| | | | | |
|---|---|---|---|---|
| 4,496,670 A | * | 1/1985 | Vas | C08K 9/08 428/407 |
| 2002/0102404 A1 | * | 8/2002 | Nakai | C08K 9/04 524/425 |
| 2004/0115452 A1 | | 6/2004 | Flexman et al. | |
| 2009/0068390 A1 | * | 3/2009 | Willems | C08J 5/18 428/220 |
| 2014/0128529 A1 | | 5/2014 | Sakai et al. | |
| 2014/0142211 A1 | * | 5/2014 | Stoever | C08K 3/26 523/105 |

FOREIGN PATENT DOCUMENTS

| | | |
|---|---|---|
| CN | 101010374 A | 8/2007 |
| WO | WO-1992-002587 A1 | 2/1995 |
| WO | WO-2017-121661 A1 | 7/2017 |

OTHER PUBLICATIONS

Furukawa, Preparation of Active Calcium Carbonate for Reinforcing SBR, Bulletin of the Institute for Chemical Research, Kyoto University, 1962, 40(4): 211-228 (Year: 1962).*
Fernando et al., "The effect of precipitated calcium carbonate on the mechanical properties of poly(vinyl chloride)" Journal of Vinyl and Additive Technology, 2008; 13(2):98-102 (dol: 10.1002/vnl.20109, p. 8, para 4—p. 9, para 1.
Wikipedia "Emulsion polymerization" Version: Sep. 20, 2017 (Sep. 20, 2017), Retrieved: Nov. 28, 2018 (Nov. 28, 2018) (https://en.wikipedia.org/w/index.php?title=Emulsion_polymerization &soldid= 801504135) p. 1, para 2.
International Search Report and Written Opinion dated Dec. 28, 2018, in International Application No. PCT/US2018/0055162 (7 pgs.).

* cited by examiner

*Primary Examiner* — Robert C Boyle
(74) *Attorney, Agent, or Firm* — Finnegan, Henderson, Farabow, Garrett, Dunner, LLP

(57) ABSTRACT

The disclosure describes the preparation and use of reactive carbonates containing a metal carbonate bound to a reactive compound, wherein the reactive compound comprises a mineral binding group and a polymer reactive group connected together by a linking group. Such reactive carbonates are useful as reagents in processes for making mineral-bound elastomeric materials, and in methods for reducing cavitation in elastomer materials.

13 Claims, No Drawings

REACTIVE CARBONATE FOR ELASTOMERIC ARTICLES

CLAIM FOR PRIORITY

This application is a U.S. national phase entry under 35 U.S.C. § 371 from PCT International Application No. PCT/US2018/055162, filed Oct. 10, 2018, which claims the benefit of priority of U.S. Provisional Patent Application No. 62/571,035, filed Oct. 11, 2017, from both of which this application claims priority and both of which are incorporated herein by reference.

FIELD OF THE DESCRIPTION

This application relates to materials technology in general and more specifically to the preparation and use of reactive carbonates capable of imparting certain characteristics of polymeric materials. This application discloses processes for making mineral-bound elastomeric materials in which a metal carbonate is bound to the polymer matrix via a polymer matrix unit comprising a mineral binding group and a linking group. The reactive carbonates disclosed herein can also contain a metal carbonate bound to a reactive compound including a mineral binding group, a polymer reactive group and a linking group. Such reactive carbonates are useful, for example, in methods for reducing cavitation in elastomeric materials.

BACKGROUND

Natural rubber latex has been widely used as a protective material for over a century. In recent years, for example, the use of rubber latex gloves has become widespread due in part to the spread of infectious diseases such as HIV and AIDS.

Minerals such as calcium carbonate are widely used in elastomeric materials as filler materials that can alter the properties of elastomeric articles, and can also reduce the use of more expensive binder materials. Calcium carbonate is widely used in natural elastomeric articles such as gloves, and is finding growing use in synthetic rubber articles such as nitrile gloves. Among the most important fillers, calcium carbonate holds the largest market volume and is mainly used in the plastics sector.

In some instances, calcium carbonate and other minerals can produce points of weakness or cavitation sites in polymeric materials including elastomeric polymers, particularly when the minerals are poorly dispersed in the polymer matrix. Cavitation is a phenomenon that can be observed during deformation (such as stretching) of a semi-crystalline polymeric material. Numerous inclusions (voids or cavities) are formed inside the amorphous phase during deformation of a polymer. The presence of unwanted inclusions formed by cavitation in elastomeric articles can lead to gradual or even catastrophic failure during use.

For example, in protective gloves formed from natural or synthetic rubber—in which it is often desirable to include minerals such as calcium carbonate in the rubber matrix to improve properties such as dexterity—a common mode of failure involves leakage or catastrophic failure at points of repeated deformation (e.g., fingertips). These points of weakness are often caused by the occurrence of cavitation sites attributed to the presence of fillers such as calcium carbonate, which tend to resist deformation of the elastomer and can therefore lead to inclusions.

Although surface modifications of minerals have been made to improve compatibility with elastomeric materials, more improvements are needed to enhance the durability of elastomeric materials subject to repeated stretching and other deformation processes.

SUMMARY

A need exists to discover methods and materials for improving the properties of elastomeric articles that include mineral materials. For example, a need exists to discover methods and materials that are capable of reducing cavitation in elastomeric articles—thereby improving the properties and durability of elastomeric articles such as protective rubber gloves.

The following disclosure describes the preparation and use of reactive minerals capable of securely bonding minerals and other inorganic filler materials to the polymer matrix of a natural or synthetic elastomers. This secure bonding of minerals and other inorganic filler materials can improve the properties of elastomeric materials by reducing the frequency and severity of points of weakness and cavitation sites occurring in elastomeric articles.

Embodiments of the present disclosure, described herein such that one of ordinary skill in this art can make and use them, include the following:

(1) Some embodiments relate to a mineral-bound elastomeric material, comprising: an elastic polymer; a polymer matrix unit comprising at least one connecting group and a mineral binding group; and inclusions of a metal carbonate bound to the polymer matrix unit via the mineral binding group, wherein the elastic polymer is covalently bound to the polymer matrix unit via the linking group;

(2) Some embodiments relate to a process for making elastomeric compositions, the process comprising reacting a monomer mixture, a prepolymer, or both, in the presence of a reactive carbonate and optionally a coupling agent, to obtain a mineral-bound elastomeric composition, wherein: the reactive carbonate comprises a metal carbonate bound to a reactive compound comprising a mineral binding group and a polymer reactive group connected together by a linking group; and the mineral-bound elastomeric composition comprises a polymer matrix to which the metal carbonate is bound via the mineral binding group;

(3) Some embodiments relate to a method for reducing cavitation in an elastomeric material, the method comprising performing a polymerization or crosslinking process in the presence of a reactive carbonate to obtain a mineral-bound elastomeric material, wherein: the reactive carbonate comprises a metal carbonate bound to a reactive compound comprising a mineral binding group and a polymer reactive group connected together by a linking group; and at least one of the following factors is controlled such that the mineral-bound elastomeric material experiences less cavitation compared to an elastomeric obtained by performing the polymerization or crosslinking process in the presence of the metal carbonate without the reactive carbonate: (a) a proportion of the reactive carbonate present in the polymerization process; (b) a particle size of the metal carbonate in the reactive carbonate; (c) a structure of the mineral binding group; (d) a structure of the polymer reactive group; (e) a structure of the linking group; (f) a number of mineral binding groups contained in the reactive carbonate; and (g) a number of polymer reactive groups contained in the reactive carbonate; and (4) Some embodiments relate to a reactive carbonate, comprising a metal carbonate bound to a reactive compound, wherein the reactive compound comprises a mineral binding group and a polymer reactive group connected together by a linking group.

Additional objects, advantages and other features of the present disclosure will be set forth in part in the description that follows and in part will become apparent to those having ordinary skill in the art upon examination of the following or may be learned from the practice of the present disclosure. The present disclosure encompasses other and different embodiments from those specifically described below, and the details herein are capable of modifications in various respects without departing from the present disclosure. In this regard, the description herein is to be understood as illustrative in nature, and not as restrictive.

DETAILED DESCRIPTION

Embodiments of this disclosure include processes for producing reactive minerals and mineral-bound polymeric materials formed therefrom. The mineral-bound polymers of the present disclosure have advantages over conventional mineral-filled polymers, because use of the reactive minerals described herein as additives can provide a polymer matrix in which a mineral such as calcium carbonate is tightly bound to the polymer matrix via a polymer matrix unit comprising a mineral binding group and a connecting group. The connecting group can comprise a saturated or unsaturated organic group comprising 6 to 24 carbon atoms and optionally at least one atom selected from the group consisting of O, N, S and a halogen; and the organic group can connect the elastic polymer to the mineral binding group. The matrix unit can be formed by performing a polymerization or crosslinking process on a monomer mixture, a prepolymer, or both, in the presence of the reactive mineral.

Some embodiments relate to a reactive mineral comprising a mineral core bound to a reactive compound, in which the reactive compound comprises a mineral binding group and a polymer reactive group connected together by a linking group.

Embodiments of the present disclosure may include any form or mechanism of bonding between the mineral core and the reactive compound such as, for example, ionic bonding and covalent bonding. Without being bound to any particular theory, it is believed that ionic bonding is the principal form or mechanism of bonding between the mineral core and the reactive compound in embodiments wherein the mineral binding group is in the form of a salt.

Although the word "core" implies that the "mineral core" may be bound to, or at least partially surrounded by, a plurality of reactive compounds, the present disclosure also includes embodiments in which a mineral substance is not bound to, or at least partially surrounded by, a plurality of reactive compounds. In some embodiments, the reactive mineral may be formed of a plurality of mineral substances bound to a reactive compound.

In some embodiments the mineral core comprises a metal salt or a clay mineral. For example, the mineral core may be a metal carbonate, a metal hydroxide, a metal phosphate, a metal sulfate and other metal salts or mixtures thereof. In other embodiments the mineral core may be selected from an aluminum salt, a barium salt, a calcium salt, a magnesium salt and other metal salts or mixtures thereof. For example, the mineral core may contain at least one metal salt selected from aluminum carbonate, aluminum phosphate, aluminum sulfate, barium carbonate, barium phosphate, barium sulfate, calcium carbonate, calcium phosphate, calcium sulfate, magnesium carbonate, magnesium phosphate, magnesium sulfate, sodium carbonate, sodium phosphate, sodium sulfate and other metal salts. In other embodiments the mineral core may contain a metal carbonate selected from a ground calcium carbonate, a precipitated calcium carbonate, and combinations thereof.

When the mineral core is obtained from a naturally occurring source, it may be that some mineral impurities will inevitably contaminate the mineral core. For example, naturally occurring calcium carbonate occurs in association with other minerals. Also, in some circumstances, minor additions of other minerals may be included, for example, one or more of kaolin, calcined kaolin, wollastonite, bauxite, talc or mica, could also be present. In general, however, the mineral core used in the embodiments of the present disclosure will contain less than 5% by weight, for example less than 2 wt %, for example less than 1% by weight of other mineral impurities.

The "mineral binding group" is a functional group capable of binding to a mineral substance used as the mineral core. In some embodiments the mineral binding group may include a functional group selected from the group consisting of a carboxylic acid, a carboxylic acid salt, a carboxylic acid derivative, an anhydride, an anhydride derivative, a phosphate, a phosphate salt, a phosphate derivative, and a sulfonate. For example, in some embodiments the reactive mineral may be a reactive carbonate comprising calcium carbonate as the mineral core and a reactive compound containing a carboxylic acid salt as the mineral binding group.

The "polymer reactive group" is a functional group capable of being incorporated into a polymer matrix by a polymerization reaction, a crosslinking reaction, an endcapping reaction or other bond-forming reaction. For example, in a mineral-bound elastomeric composition formed in the presence of the reactive mineral, the polymer reactive group is generally converted from the functional group described above into a unit derived from the functional group. Unlike conventional surface-modified fillers used to alter the properties of conventional polymeric materials, the presence of at least one polymer reactive group in the reactive minerals of the present disclosure enables the reactive minerals to become more tightly bound to a polymer matrix due to participation of the polymer reactive groups in polymerization or crosslinking processes that convert the polymer reactive groups into organic groups covalently-bound to the polymer matrix. In some embodiments the polymer reactive group may include a functional group selected from an alkene group, an alkyne group, a halogen group, a hydroxyl group, an ether group, an ester group, a lactone group, a thiol group, a thioester group, an epoxide group, an amine group, an amide group, an imine group, an isocyanate group, a sulfide group, a sulfate group, a maleimide group, an acrylate group or mixtures thereof from. In some embodiments the reactive mineral may include a plurality of polymer reactive groups which may be the same or different functional group The "connecting group" comprises an organic group and a functional group capable of being incorporated into a polymer matrix by a polymerization reaction, a crosslinking reaction, an endcapping reaction or other bond-forming reaction capable of connecting the polymer to at least one mineral binding group. For example, the organic group can be saturated or unsaturated and can contain 2 to 30 carbon atoms and optionally at least one atom selected from the group consisting of O, N, S and a halogen such that, in a mineral-bound elastomeric composition formed from reactive mineral, the organic group and functional group connect a polymer matrix of the elastomeric composition to the mineral binding group. In other embodiments the saturated or unsaturated organic group may contain 6 to 24 carbon atoms, or 8 to 20 carbon atoms, or 9 to 15 carbon atoms. The functional group can be selected from an alkene group, an alkyne group, a halogen group, a hydroxyl group, an ether group, an ester group, a lactone group, a thiol group, a thioester group, an epoxide group, an amine group, an amide group, an imine group, an isocyanate group, a sulfide group, a sulfate group, a maleimide group, an acrylate group or mixtures thereof from. In some embodiments the connecting group contains an aliphatic or aromatic spacer group including the functional group.

The "linking group" is an organic group capable of connecting at least one mineral binding group to at least one polymer reactive group. For example, the linking group may contain a saturated or unsaturated organic group containing 2 to 30 carbon atoms and optionally at least one atom selected from the group consisting of O, N, S and a halogen such that, in a mineral-bound elastomeric composition formed from reactive mineral, the organic group connects to the polymer reactive group which connects a polymer matrix of the elastomeric composition to the mineral binding group. In other embodiments the saturated or unsaturated organic group may contain 6 to 24 carbon atoms, or 8 to 20 carbon atoms, or 9 to 15 carbon atoms. In some embodiments the linking group contains an aliphatic or aromatic spacer group including a functional group selected from an ether group, an ester group, an amine group, a halogen group, an amide group, an imine group, a sulfide group, a sulfate group, or mixtures thereof.

In some embodiments the organic group of the connecting group or the linking group is an organic group comprising at least one unsaturated bond. For example, in some embodiments the linking group is an organic group comprising at least one unsaturated bond at a terminal end of the organic group.

In some embodiments the reactive mineral may comprise a mineral core bound to a reactive compound or polymer matrix unit of either formula (1a) or (1 b), or combinations thereof:

  (1a), wherein:
Z represents a hydrogen atom, a metal ion, or an ammonium ion;
X represents a moiety selected from the group consisting of $CO_2$, $PO_3$, $PO_4$, $SO_3$, or $SO_4$
$L^1$ independently represents a $C_{1-30}$alkyl group, branched alkyl group, a $C_{1-30}$ alkenyl group, a branched alkenyl group, wherein the alkenyl or branched alkenyl group can have more than one unsaturated carbon atom, a $C_{3-30}$ alicyclic group, a $C_{6-30}$ aromatic group or a $C_{3-30}$ heteroaromatic group, said groups optionally including at least one bridging atom selected from the group consisting of O, N and S;
$R^1$ independently represents an organic group comprising a polymerizable functional group selected from the group consisting of an alkene group, an alkyne group, a halogen group, a hydroxyl group, an ester group, a lactone group, a thiol group, a thioester group, an epoxy group, an amine group, and an isocyanate group;

$L^2$ independently represents an optionally-substituted $C_{1-30}$ alkylene group, an optionally-substituted $C_{1-30}$ alkenylene group, an optionally-substituted $C_{3-30}$ alicyclic group, an optionally-substituted $C_{6-30}$ aromatic group or an optionally-substituted $C_{3-30}$ heteroaromatic group, said groups optionally including at least one bridging atom selected from the group consisting of O, N and S;
$R^2$ independently represents an organic group comprising a polymerizable functional group which is branched or unbranched and selected from the group consisting of an alkene group, an alkyne group, a halogen group; a hydroxyl group, an ester group, a lactone group, a thiol group, a thioester group, an epoxy group, an amine group, and an isocyanate group;
b represents an integer of 1 to 4;
c represents an integer of 0 to 4; and
d represents an integer of 0 to 4;
OR

  (1b)

wherein
A is a moiety containing a terminating ethylenic bond with one or more adjacent carbonyl groups;
X is O and m is 1 to 4 or X is N and m is 1;
Y is $C_{1-18}$-alkylene or $C_{2-18}$-alkenylene;
B is $C_{2-6}$-alkylene;
n is 0 to 5:
provided that when A contains two carbonyl groups adjacent to the ethylenic group, X is N. B can be substituted by one or more $C_{1-6}$-alkyl groups which may be linear or branched. The group (O—B—CO)$_n$ can be the residue of one or more different hydroxy carboxylic acids or lactones thereof. B can contain 5 or 6 carbon atoms. Non-limiting examples of suitable hydroxy carboxylic acids or lactones are 5-hydroxy valeric acid, 6-hydroxy caproic acid, δ-valerocatone, ε-caprolactone and the alkyl substituted ε-caprolactones such as 4-methyl, 3-methyl, 7-methyl, 5-methyl, 5-tert butyl, 4,4,6-trimethyl and 4,6,6-trimethyl ε-caprolactone. When the group (O—B—CO)$_n$ is the residue of two or more different hydroxy carboxylic acids or lactones it can be derived from δ-valerolactone and ε-caprolactone. When (O—B—CO)$_n$ is derived from two or more different hydroxy carboxylic acids or lactones thereof, 6-hydroxy caproic acid or δ-caprolactone can be the major components.

For example, in some embodiments the reactive compound is selected from β-carboxyethylacrylate, β-carboxyhexyl maleimide, 10-carboxydecyl maleimide, 5-carboxypentyl maleimide, β-acryloyloxypropanoic acid, or mixtures thereof.

Reactive minerals of this disclosure may be constructed of linking groups having unbranched chains and/or branched chains each having one or more polymer reactive group. The reactive minerals may be constructed of linking groups having a variety of chain lengths, including mixtures of reactive minerals constructed of different linking groups having a variety of chain lengths.

Reactive minerals may be produced by combining a mineral core such as calcium carbonate with a reactive compound, in which the combining may occur in dry form or as a slurry of the calcium carbonate and the reactive compound in water, an organic solvent, or a combination thereof. Prior to the combining step, the mineral core may be subjected to wet or drying grinding in order to set the particle characteristics of the mineral core. Such wet or dry grinding and/or the combining step may occur in the presence or absence of a dispersant.

In some embodiments the reactive mineral is a reactive carbonate comprising a metal carbonate bound to the reactive compound. For example, the metal carbonate may be an alkali metal carbonate or an alkaline earth metal carbonate. In other embodiments the metal carbonate is selected from magnesium carbonate, calcium carbonate, strontium carbonate or barium carbonate. In still other embodiments the metal carbonate may be a particular metal carbonate, such as a ground calcium carbonate (GCC), a precipitated calcium carbonate (PCC), or combinations thereof.

A particulate calcium carbonate used as the metal carbonate in the present disclosure may be obtained from a natural source by grinding (GCC) or may be prepared synthetically by precipitation (PCC), or may be a combination of the two, i.e., a mixture of the naturally derived ground material and the synthetic precipitated material. A PCC used as the reactive carbonate in the present disclosure may also be ground.

A GCC used as the metal carbonate in the present disclosure may be obtained by grinding a mineral source such as chalk, marble or limestone, which may be followed by a particle size classification step, in order to obtain a product having the desired degree of fineness. The particulate solid material may be ground autogenously, i.e., by attrition between the particles of the solid material themselves, or alternatively, in the presence of a particulate grinding medium comprising particles of a different material from the calcium carbonate to be ground. Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

A PCC used as the metal carbonate in the present disclosure may be produced by any of the known methods available in the art. TAPPI Monograph Series No 30, "Paper Coating Pigments", pages 34-35 describes the three main commercial processes for preparing PCC which is suitable for use in the various embodiments of the present disclosure. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide must be substantially completely separated from the calcium carbonate if this process is to be commercially attractive. In the third main commercial process, the milk of lime is first contacted with ammonium chloride to give a calcium chloride solution and ammonia gas. The calcium chloride solution is then contacted with soda ash to produce, by double decomposition, precipitated calcium carbonate and a solution of sodium chloride.

The process for making PCC results in very pure calcium carbonate crystals and water. The crystals can be produced in a variety of different shapes and sizes, depending on the specific reaction process that is used. The three main forms of PCC crystals are aragonite, rhombohedral and scalenohedral, all of which are suitable for use in the various embodiments of the present disclosure, including mixtures thereof.

The reactive mineral of the present disclosure, such as a reactive carbonate, may be in the form of a particulate reactive mineral having a $d_{10}$ ranging from about 0.01 μm to about 2 μm. For example, the reactive mineral may have a $d_{10}$ ranging from about 0.01 μm to about 1.5 μm or from about 0.01 μm to about 1 μm or from about 0.01 μm to about 0.5 μm or from about 0.1 μm to about 2 μm or from about 0.1 μm to about 1.5 μm or from about 0.1 μm to about 1 μm or from about 0.1 μm to about 0.5 μm.

The reactive mineral of the present disclosure, such as a reactive carbonate, may be in the form of a particulate reactive mineral having a $d_{50}$ ranging from about 0.3 μm to about 5 μm. For example, the reactive mineral may have a $d_{50}$ ranging from about 0.4 μm to about 5 μm or from about 0.5 μm to about 5 μm or from about 1 μm to about 4.5 μm or from about 1 μm to about 4 μm or from about 1 μm to about 2 μm or from about 1.5 μm to about 4 μm or from about 2 μm to about 3.5 μm or from about 2.5 μm to about 3 μm. In other embodiments the reactive mineral may have a $d_{50}$ ranging from about 1 μm to about 2 μm, for example from about 1 μm to about 1.75 μm, for example from about 1 μm to about 1.5 μm.

The reactive mineral of the present disclosure, such as a reactive carbonate, may be in the form of a particulate reactive mineral having a $d_{90}$ ranging from about 1 μm to about 10 μm. For example, the reactive mineral may have a $d_{90}$ ranging from about 1 μm to about 9 μm or from about 1 μm to about 8 μm or from about 1 μm to about 7 μm or from about 1 μm to about 6 μm. In other embodiments the particulate mineral may have a $d_{90}$ ranging from about 2 μm to about 10 μm or from about 2 μm to about 9 μm or from about 2 μm to about 8 μm or from about 2 μm to about 7 μm or from about 2 μm to about 6 μm.

The reactive mineral of the present disclosure, such as a reactive carbonate, may be in the form of a particulate reactive mineral having a $d_{98}$ ranging from about 3 μm to about 15 μm. For example, the reactive mineral may have a $d_{98}$ ranging from about 3 μm to about 14 μm or from about 3 μm to about 13 μm or from about 3 μm to about 12 μm or from about 3 μm to about 11 μm or from about 3 μm to about 10 μm or from about 3 μm to about 9 μm. In other embodiments the reactive mineral may have a $d_{98}$ ranging from about 4 μm to about 12 μm or from about 4 μm to about 11 μm or from about 4 μm to about 10 μm or from about 4 μm to about 9 μm.

The reactive mineral of the present disclosure, such as a reactive carbonate, may be in the form of a particulate reactive mineral having a steepness factor ranging from about 20 to about 70. For example, the reactive mineral may have a steepness factor ranging from about 20 to about 65 or from about 20 to about 60 or from about 25 to about 55 or from about 30 to about 50 or from about 35 to about 45 or from about 30 to about 40.

The reactive mineral of the present disclosure, such as a reactive carbonate, may be in the form of a particulate reactive mineral having a $d_{50}$ ranging from about 0.5 μm to about 2 μm, a $d_{98}$ ranging from about 4 μm to about 10 μm and a $d_{10}$ ranging from about 0.1 μm to about 0.6 μm. The reactive mineral may, for example, also have a $d_{90}$ ranging from about 2 μm to about 6 μm. The reactive mineral may, for example, also have a steepness factor ranging from about 20 to about 50.

The reactive mineral of the present disclosure, such as a reactive carbonate, may be in the form of a particulate reactive mineral having a $d_{50}$ ranging from about 0.5 μm to about 1.5 μm, a $d_{98}$ ranging from about 4 μm to about 5 μm and a $d_{10}$ ranging from about 0.1 μm to about 0.4 μm. The reactive mineral may, for example, also have a $d_{90}$ ranging from about 2 μm to about 3 μm. The reactive mineral may, for example, also have a steepness factor ranging from about 40 to about 50.

The reactive mineral of the present disclosure, such as a reactive carbonate, may be in the form of a particulate reactive mineral having a $d_{50}$ ranging from about 1 μm to about 2 μm, a $d_{98}$ ranging from about 7.5 μm to about 9 μm and a $d_{10}$ ranging from about 0.3 μm to about 0.4 μm. The reactive mineral may, for example, also have a $d_{90}$ ranging from about 4.5 μm to about 5.5 μm. The reactive mineral may, for example, also have a steepness factor ranging from about 20 to about 30.

The reactive mineral of the present disclosure, such as a reactive carbonate, may be in the form of a particulate reactive mineral having a $d_{50}$ ranging from about 1 μm to about 2 μm, a $d_{98}$ ranging from about 5 μm to about 7 μm and a $d_{10}$ ranging from about 0.4 μm to about 0.6 μm. The reactive mineral may, for example, also have a $d_{90}$ ranging from about 2.5 μm to about 4 μm. The reactive mineral may, for example, also have a steepness factor ranging from about 45 to about 55.

Unless otherwise stated, particle size properties referred to herein for the particulate materials such as the reactive mineral are as measured in a well known manner by sedimentation of the particulate filler or material in a fully dispersed condition in an aqueous medium using a Sedigraph 5100 machine as supplied by Micromeritics Instruments Corporation, Norcross, Ga., USA (telephone: +17706623620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{98}$, $d_{90}$ and the $d_{10}$ are the values determined in this way of the particle e.s.d. at which there are 98%, 90% and 10% respectively by weight of the particles which have an equivalent spherical diameter less than that $d_{98}$, $d_{90}$ or $d_{10}$ value. Steepness factor is defined as $(d_{30}/d_{70} \times 100)$. The particle size properties referred to herein relate to the particle size properties of the particulate mineral without any coating.

The reactive mineral of the present disclosure, such as a reactive carbonate, may be in the form of a particulate reactive mineral having a surface area ranging from about 1 $m^2/g$ to about 50 $m^2/g$. For example, the reactive mineral may have a surface area ranging from about 2 $m^2/g$ to about 45 $m^2/g$ or from about 3 $m^2/g$ to about 40 $m^2/g$ or from about 4 $m^2/g$ to about 35 $m^2/g$ or from about 5 $m^2/g$ to about 30 $m^2/g$. In other embodiments the reactive mineral may have a surface area ranging from about 1 $m^2/g$ to about 15 $m^2/g$ or from about 1.5 $m^2/g$ to about 14.5 $m^2/g$ or from about 2 $m^2/g$ to about 14 $m^2/g$ or from about 3 $m^2/g$ to about 13 $m^2/g$ or from about 4 $m^2/g$ to about 12 $m^2/g$ or from about 5 $m^2/g$ to about 11 $m^2/g$ or from about 6 $m^2/g$ to about 10 $m^2/g$ or from about 7 $m^2/g$ to about 9 $m^2/g$.

The surface area of particulate materials used herein, such as the reactive mineral, may be determined according to the BET method by the quantity of nitrogen adsorbed on the surface of said particles so as to as to form a monomolecular layer completely covering said surface (measurement according to the BET method, AFNOR standard X11-621 and 622 or ISO 9277). In certain embodiments, specific surface is determined in accordance with ISO 9277, or any method equivalent thereto. The surface area properties referred to herein relate to the surface area of particulate materials without any coating.

In some embodiments the reactive mineral is a reactive carbonate comprising a mineral core of calcium carbonate satisfying at least one of the following conditions: (i) the calcium carbonate is in the form of particles having a $d_{10}$ ranging from about 0.01 μm to about 2 μm; (ii) the calcium carbonate is in the form of particles having a $d_{50}$ ranging from about 0.3 μm to about 5 μm; (iii) the calcium carbonate is in the form of particles having a $d_{90}$ ranging from about 1 μm to about 10 μm; (iv) the calcium carbonate is in the form of particles having a $d_{98}$ ranging from about 3 μm to about 15 μm; and (v) the calcium carbonate is in the form of particles having a steepness factor ranging from about 20 to about 70.

In some embodiments the reactive mineral is a reactive carbonate in which the metal carbonate comprises calcium carbonate and the reactive compound is an unsaturated carboxylic acid or unsaturated carboxylic acid salt. For example, in some embodiments the reactive mineral is a reactive carbonate in which the metal carbonate is calcium carbonate and the reactive compound is 9-decenoic acid.

As mentioned above, the word "core" implies that the mineral core may be bound to, or at least partially surrounded by, a plurality of reactive compounds. Thus, in some embodiments the reactive mineral is a reactive carbonate comprising a metal carbonate core at least partially covered by a layer of the reactive compound, such that the mineral binding group is bound directly to a surface of the metal carbonate core.

Embodiments of this disclosure also relate to compositions containing an elastomeric material, a reactive mineral such as the reactive carbonate described above, and optionally a crosslinking agent.

Embodiments of this disclosure also include a process for making an elastomeric composition, including the steps of reacting a monomer mixture, a prepolymer, or both, in the presence of the reactive mineral and optionally a coupling agent, to obtain a mineral-bound elastomeric composition in which the mineral core is bound to a polymer matrix via the mineral binding group.

For example, some embodiments relate to a process for making an elastomeric composition in which a monomer mixture, a prepolymer, or both, are reacted in the presence of a reactive carbonate and optionally a coupling agent, to obtain a calcium carbonate-bound elastomeric composition, wherein the reactive carbonate comprises a metal carbonate bound to a reactive compound comprising a mineral binding group and a polymer reactive group connected together by a linking group, and the mineral-bound elastomeric composition comprises a polymer matrix to which the metal carbonate is bound via the mineral binding group.

The "polymer matrix" may be selected from an elastomeric material such as an acrylonitrile-butadiene rubber, hydrogenated acrylonitrile-butadiene rubber, an ethylene propylene diene rubber, a fluorocarbon rubber, a chloropropene rubber, a silicone rubber, a fluorosilicone rubber, a polyacrylate rubber, an ethylene acrylic rubber, a styrene-butadiene rubber, a polyester urethane rubber, a polyether urethane rubber, a polyester urethane/polyether urethane rubber, a natural rubber, or a mixture thereof.

In some embodiments the process for making an elastomeric composition involves reacting a mixture containing the reactive carbonate and at least one prepolymer selected from a polyacrylate polymer, an ethylene-acrylate polymer, a polyester urethane, a bromo isobutylene isoprene polymer, a polybutadiene, a chloroisobutylene isoprene polymer, a polychloroprene, a chlorosulphonated polyethylene, an epichlorohydrin polymer, an ethylene propylene polymer, an ethylene propylene diene polymer, a polyether urethane, a fluorocarbon polymer, a fluorosilicone polymer, a hydrogenated nitrile butadiene polymer, a polyisoprene, an isobutylene isoprene butyl polymer, an acrylonitrile butadiene polymer, a polyurethane, a styrene-butadiene polymer, a styrene ethylene butylene styrene copolymer, a polysiloxane, a vinyl methyl silicone polymer, an acryonitrile butadiene carboxy polymer, a styrene butadiene carboxy polymer, or mixtures thereof.

As mentioned above the process for making a mineral-bound elastomeric composition may include the presence of at least one coupling agent. Suitable coupling agents include vulcanization agents, crosslinking agents, curing agents, accelerators, and mixtures thereof. Such coupling agents can be used to modify an elastomeric material or prepolymer by forming cross-links (bridges) between individual polymer chains, and between polymers chains and the polymer reactive group of the reactive compound. Examples of coupling agents suitable for processes of the present disclosure include sulfur-based vulcanization agents, peroxide-based coupling agents, phenol-based coupling agents, metallic and non-metallic oxide-based coupling agents, silane-based coupling agents and urethane-based coupling agents.

Examples of sulfur-based coupling agents include powdered sulfur, precipitated sulfur, highly dispersible sulfur, surface treated sulfur, insoluble sulfur, dimorpholine disulfide, alkylphenol disulfide, and the like. Examples peroxide-based coupling agents include benzoyl peroxide, t-butyl hydroperoxide, 2,4-dichlorobenzoyl peroxide, 2,5-dimethyl-2,5-di(t-butyl peroxy)hexane, 2,5-dimethylhexane-2,5-di (peroxyl benzoate), and the like. Examples phenol resin-based coupling agents include brominated alkylphenol resins and mixed crosslinking system containing an alkyl phenol resin with a halogen donor such as tin chloride and chloroprene. Examples of oxide-based coupling agents include zinc oxide, magnesium oxide, litharge, p-quinone dioxime, p-dibenzoylquinone dioxime, tetrachloro-p-benzoquinone, poly-p-dinitroso benzene, methylenedianiline, and the like.

Examples of accelerators include an aldehyde-ammonia base, a guanidine base, a thiazole base, a sulfenamide base, a thiuram base, a dithio acid salt base, a thiourea base, and the like. Specific examples include an aldehyde ammonia vulcanization accelerator such as hexamethylene tetramine and the like; a guanidine vulcanization accelerator such as diphenyl guanidine and the like; a thiazole vulcanization accelerator such as dibenzothiazyl disulfide (DM), 2-mercaptobenzothiazole and its Zn salt, a cyclohexylamine salt, and the like; a sulfenamide vulcanization accelerator such as cyclohexyl benzothiazyl sulfenamide (CBS), N-oxydiethylene benzothiazyl-2-sulfenamide, N-t-butyl-2-benzothiazole sulfenamide, 2-(thymol polynyl dithio)benzothiazole, and the like; a thiuram vulcanization accelerator such as tetramethylthiuram disulfide (TMTD), tetraethylthiuram disulfide, tetramethylthiuram monosulfide (TMTM), dipentamethylenethiuram tetrasulfide, and the like; a dithionate vulcanization accelerator such as Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, pipecoline pipecolyl dithiocarbamate, and the like; and a thiourea vulcanization accelerator such as ethylene thiourea, diethyl thiourea, and the like.

In some embodiments the process for making a mineral-bound elastomeric involves reacting a vulcanizable elastomer in the presence of the reactive carbonate and a vulcanization agent to obtain a crosslinked, mineral-bound elastomeric composition.

In some embodiments the process for making a mineral-bound elastomeric composition may be carried in the presence of an additive selected from water, an organic solvent, a dispersant, an inorganic filler, an organic filler, a pigment, an antioxidant, a wax, a radical initiator, an impact modifier, mixtures thereof. In some embodiments the reacting step of the process does not occur in the presence of a silane or silanol.

The process for making a mineral-bound elastomeric composition may be carried out such that the reacting of the monomer mixture, the prepolymer, or both, occurs in the presence of a non-reactive mineral. For example, the reacting may occur in the presence of a non-reactive mineral selected from a non-reactive calcium carbonate, a talc, a diatomaceous earth, a clay, and combinations thereof.

In some embodiments the process for making a mineral-bound elastomeric composition may be carried out such that a proportion of the metal carbonate bound in the elastomeric composition ranges from about 0.1 to about 80, or from about 1 to about 50, or from about 5 to about 30, parts per 100 parts of the polymer matrix.

The present disclosure also includes mineral-bound elastomeric compositions obtained by the process described above, and articles containing the mineral-bound elastomeric composition. For example, embodiments of the present disclosure include protective articles such as rubber garments and gloves formed from the mineral-bound elastomeric compositions. Such articles are expected to exhibit improved properties such as greater material and strength and less cavitation, relative to similar articles make from mineral-filled elastomeric compositions. Embodiments also include articles formed from mineral-bound polymer compositions based on other (non-elastomeric) types of polymers such as polyolefins, polyamides, polycarbonates, polyimides, polyurethanes, polyethylenemines, polyoxymethylenes, polyesters, polyacrylates, polylactic acids, polysiloxanes and copolymers and blends thereof such as acrylonitrile-butadiene-styrene (ABS) copolymers, and the like.

Embodiments of this disclosure also include a mineral-bound elastomeric material containing (1) an elastic polymer, (2) a polymer matrix unit comprising at least one linking group and a mineral binding group, and (3) inclusions of a mineral core bound to the polymer matrix unit via the mineral binding group, in which the elastic polymer is covalently bound to the polymer matrix unit via the linking group.

The "elastic polymer" may be an elastic polymer formed by reacting a monomer mixture, prepolymer, or both, as described above with respect to the process for making an elastomeric composition. For example, the elastic polymer may be selected from an acrylonitrile-butadiene rubber, hydrogenated acrylonitrile-butadiene rubber, an ethylene propylene diene rubber, a fluorocarbon rubber, a chloropropene rubber, a silicone rubber, a fluorosilicone rubber, a polyacrylate rubber, an ethylene acrylic rubber, a styrene-butadiene rubber, a polyester urethane rubber, a polyether urethane rubber, a polyester urethane/polyether urethane rubber, a natural rubber, or mixtures thereof.

The "polymer matrix unit" is generally formed during the reaction of a monomer mixture, prepolymer, or both, due to the presence of the polymer reactive group described above in the reactive mineral. Given that the linking group and the mineral binding group of the reactive mineral are generally not reacted during the formation of the polymer matrix unit, the polymer matrix unit still contains the linking group and the mineral binding group. The presence of the mineral binding group in the polymer matrix unit enables the elastic polymer to bind the mineral core in a manner that cannot be attained using traditional non-reactive mineral fillers. This tight binding of mineral core materials (such as calcium carbonate) in the mineral-bound elastomer materials of the present disclosure imparts improved properties such as improved tensile strength, improved elongation at break, improved Young's Modulus, improved toughness and less cavitation.

In some embodiments the polymer matrix unit may include a plurality of linking groups.

The "linking group" contained in the polymer matrix unit includes the linking groups described above in greater detail. For example, the linking group may include a saturated or unsaturated organic group comprising 6 to 24 carbon atoms and optionally at least one atom selected from the group consisting of O, N, S and a halogen. In linking groups of the present disclosure the organic group connects the elastic polymer to the mineral binding group as described above.

In mineral-bound elastomeric materials of the present disclosure, the "mineral binding group" and the "mineral core" may be defined as described above with respect to the reactive mineral. For example, the mineral binding group may include a functional group selected from the group consisting of a carboxylic acid, a carboxylic acid salt, a carboxylic acid derivative, an anhydride, an anhydride derivative, a phosphate, a phosphate salt, a phosphate derivative, and a sulfonate—and the mineral core may be a metal carbonate, a metal hydroxide, a metal phosphate, a metal sulfate and other metal salts or mixtures thereof.

In some embodiments the mineral core may be selected from an aluminum salt, a barium salt, a calcium salt, a magnesium salt and other metal salts or mixtures thereof. The mineral core may contain at least one metal salt selected from aluminum carbonate, aluminum phosphate, aluminum sulfate, barium carbonate, barium phosphate, barium sulfate, calcium carbonate, calcium phosphate, calcium sulfate, magnesium carbonate, magnesium phosphate, magnesium sulfate, sodium carbonate, sodium phosphate, sodium sulfate and other metal salts. In other embodiments the mineral core may contain a metal carbonate selected from a ground calcium carbonate, a precipitated calcium carbonate, and combinations thereof.

For instance, in some embodiments the mineral-bound elastomeric materials may contain a carboxylic acid or salt thereof as the mineral binding group, and may contain is an alkali metal carbonate or an alkaline earth metal carbonate as the mineral core.

The "inclusions" contained in the mineral-bound elastomer materials are in the form of bodies or particles of the mineral core that are different from the organic portion of the elastic polymer. As explained above the inclusions of a mineral core, such as a metal carbonate, are bound to the polymer matrix unit via the mineral binding group. The inclusions may have any shape or size, as long as the inclusions are measurably different from the organic portion of the elastic polymer.

In some embodiments the inclusions satisfy at least one of the following conditions: (i) the inclusions comprise particles of the metal carbonate having a $d_{10}$ ranging from about 0.01 μm to about 2 μm; (ii) the inclusions comprise particles of the metal carbonate having a $d_{50}$ ranging from about 0.3 μm to about 5 μm; (iii) the inclusions comprise particles of the metal carbonate having a $d_{90}$ ranging from about 1 μm to about 10 μm; (iv) the inclusions comprise particles of the metal carbonate having a $d_{98}$ ranging from about 3 μm to about 15 μm; and (v) the inclusions comprise particles of the metal carbonate having a steepness factor ranging from about 20 to about 70.

In some embodiments a proportion of inclusions smaller than 0.1 μm is no more than about 5% by volume, relative to a total volume of the mineral-bound elastomeric material. In other embodiments a proportion of inclusions smaller than 0.1 μm is no more that about 3% by volume, or 2% by volume, or 1% by volume, relative to the total volume of the mineral-bound elastomer material.

Mineral-bound elastomer materials of the present disclosure may also include additional components such that, for example, water, an organic solvent, a dispersant, an inorganic filler, an organic filler, a pigment, an antioxidant, a wax, an impact modifier, and mixtures thereof.

Particulate fillers that may also be contained in mineral-bound elastomer materials of the present disclosure include, for example, an alkaline earth metal carbonate (for example dolomite, i.e. $CaMg(CO_3)_2$), a metal sulfate (for example gypsum), a metal silicate, a metal oxide (for example titanic, iron oxide, chromia, antimony trioxide or silica), a metal hydroxide (e.g. alumina trihydrate), a wollastonite, a bauxite, a talc (for example, French chalk), a mica, a zinc oxide (for example, zinc white or Chinese white), a titanium dioxide (for example, anatase or rutile), a zinc sulphide, a calcium carbonate (for example precipitated calcium carbonate (PCC), ground calcium carbonate (GCC), for example obtained from limestone, marble and/or chalk, or surface-modified calcium carbonate), a barium sulfate (for example, barite, blanc fixe or process white), an alumina hydrate (for example, alumina trihydrate, light alumina hydrate, lake white or transparent white), a clay (for example kaolin, calcined kaolin, China clay or bentonite), a silica- or silicate-based mineral (e.g. diatomaceous earth), a zeolite, or blends thereof.

The present disclosure also includes articles containing the mineral-bound elastomeric composition. For example, embodiments of the present disclosure include protective articles such as rubber garments and gloves formed from the mineral-bound elastomeric compositions. Such articles are expected to exhibit improved properties such as increased toughness and strength, with less cavitation, relative to similar articles make from mineral-filled elastomeric compositions. For example, some embodiments relate to protective gloves containing a mineral-bound elastomer composition that resists cavitation. Embodiments also include articles formed from mineral-bound polymer compositions based on other (non-elastomeric) types of polymers such as polyolefins, polyamides, polycarbonates, polyimides, polyurethanes, polyethylenemines, polyoxymethylenes, polyesters, polyacrylates, polylactic acids, polysiloxanes and copolymers and blends thereof such as acrylonitrile-butadiene-styrene (ABS) copolymers, just to name a few.

Some embodiments relate to a method for reducing cavitation in an elastomeric material, which involves performing a polymerization or crosslinking process in the presence of a reactive mineral to obtain a mineral-bound elastomeric material, wherein: (1) the reactive mineral comprises a mineral core bound to a reactive compound comprising a mineral binding group and a polymer reactive group connected together by a linking group; and (2) at least one of the following factors is controlled such that the mineral-bound elastomeric material experiences less cavitation compared to an elastomer obtained by performing the polymerization or crosslinking process in the presence of the mineral core without the reactive mineral: (a) a proportion of the reactive mineral present in the polymerization process; (b) a particle size of the mineral core in the reactive mineral; (c) a structure of the mineral binding group; (e) a structure of the polymer reactive group; (e) a structure of the linking group; (f) a number of mineral binding groups contained in the reactive mineral; and (g) a number of polymer reactive groups contained in the reactive mineral.

The "mineral core," "mineral binding group," "polymer reactive group", "connecting group", and "linking group" in the method for reducing cavitation correspond to the same components as described above. For example, in some embodiments the reactive mineral is a reactive carbonate comprising a metal carbonate bound to the reactive compound.

As explained above, cavitation is a phenomenon in which inclusions in the form of voids or cavities are formed inside the amorphous phase of a polymer. Cavitation often occurs during deformation (such as stretching) of a semi-crystalline polymeric material. The formation of unwanted inclusions by cavitation is especially problematic in elastomeric materials, and often leads to gradual or even catastrophic failure during use.

In accordance with the various embodiments of the present disclosure, cavitation can be mitigated (reduced or even eliminated) by preparing elastomeric compositions in the presence of a reactive mineral. Without being bound to any theory, it is believed that mineral-bound elastomeric materials of the present disclosure reduce cavitation relative to conventional mineral-filled elastomer materials, because the mineral core in elastomeric compositions described herein is more tightly bound to the polymer matrix via the mineral binding group—which itself is covalently bound to the polymer matrix.

Because the rigidity of the mineral core bound to the polymer matrix is directly affected by the properties of the connecting group and mineral binding group, or bound to the reactive component which is directly affected by the properties of the mineral binding group, the polymer reactive group and the linking group, it is possible to modulate the cavitation characteristics of the mineral-bound elastomeric material by controlling factors such as: the structure of the mineral binding group; the structure of the polymer reactive group; the structure of the linking group; the structure of the connecting group; the number of mineral binding groups contained in the reactive mineral and the number of polymer reactive groups contained in the reactive mineral, and combinations thereof. Furthermore, the cavitation characteristics of the mineral-bound elastomeric material can be further modulated by controlling: the proportion of the reactive mineral present in the polymerization process; the particle size of the mineral core in the reactive mineral, and a combination thereof.

In some embodiments the method for reducing cavitation involves performing a crosslinking process in the presence of a reactive carbonate comprising calcium carbonate bound to a reactive compound comprising: a carboxylic acid salt as the mineral binding group; and an alkene group or an alkyne group as the polymer reactive group. In other embodiments the mineral-bound elastomeric material is formed by crosslinking an elastomer in the presence of the reactive carbonate and a coupling agent, such as a vulcanization agent. Suitable coupling agents and vulcanization agents are described above.

Certain combinations of factors may be controlled in order to more effectively reduce cavitation in elastomeric materials. For example, in some embodiments the cavitation experienced by the mineral-bound elastomeric material is reduced by controlling: a number of carbon atoms in the linking group or connecting group; a number of, or size of, organic branching groups contained in the linking group or connecting group; a number of polymer reactive groups contained in the reactive carbonate; and combinations thereof.

Embodiments

Embodiment [1] relates to a process for making an elastomeric composition, the process comprising reacting a monomer mixture, a prepolymer, or both, in the presence of a reactive carbonate and optionally a coupling agent, to obtain a mineral-bound elastomeric composition, wherein: the reactive carbonate comprises a metal carbonate bound to a reactive compound comprising a mineral binding group and a polymer reactive group connected together by a linking group; and the mineral-bound elastomeric composition comprises a polymer matrix to which the metal carbonate is bound via the mineral binding group.

Embodiment [2] relates to the process of Embodiment [1], wherein the metal carbonate is an alkali metal carbonate or an alkaline earth metal carbonate.

Embodiment [3] relates to the process of Embodiment [1] and [2], wherein the metal carbonate is selected from the group consisting of a ground calcium carbonate, a precipitated calcium carbonate, and combinations thereof.

Embodiment [4] relates to the process of Embodiments [1]-[3], wherein the mineral binding group comprises at least one functional group selected from the group consisting of a carboxylic acid, a carboxylic acid salt, a carboxylic acid derivative, an anhydride, an anhydride derivative, a phosphate, a phosphate salt, a phosphate derivative and a sulfonate.

Embodiment [5] relates to the process of Embodiments [1]-[4], wherein the polymer reactive group comprises at least one polymerizable functional group selected from the group consisting of an alkene group, an alkyne group, a halogen group, a hydroxyl group, an ester group, a lactone group, a thiol group, a thioester group, an epoxide group, an amine group, an isocyanate group, a maleimide group, an acrylate group and combinations thereof.

Embodiment [6] relates to the process of Embodiments [1]-[5], wherein: the linking group comprises a saturated or unsaturated organic group comprising 6 to 24 carbon atoms and optionally at least one atom selected from the group consisting of O, N, S and a halogen; and the organic group connects the polymer matrix to the mineral binding group.

Embodiment [7] relates to the process of Embodiments [1]-[6], wherein the reactive compound is a compound of formula (1a) or (1 b); (1a): $(R^2)_d\text{-}(L^2)_c\text{-}(R^1)_b\text{-}(L^1)\text{-}X\text{—}Z$, wherein: Z represents a hydrogen atom, a metal ion, or an ammonium ion; X represents a moiety selected from the group consisting of $CO_2$, $PO_3$, $PO_4$, $SO_3$, or $SO_4L^1$ independently represents a $C_{1-30}$alkyl group, branched alkyl group, a $C_{1-30}$alkenyl group, a branched alkenyl group, a $C_{3-30}$alicyclic group, a $C_{6-30}$ aromatic group or a $C_{3-30}$ heteroaromatic group, said groups optionally including at least one bridging atom selected from the group consisting of O, N and S; $R^1$ independently represents an organic group comprising a polymerizable functional group selected from the group consisting of an alkene group, an alkyne group, a halogen group, a hydroxyl group, an ester group, a lactone group, a thiol group, a thioester group, an epoxy group, an amine group, and an isocyanate group; $L^2$ independently represents an optionally-substituted $C_{1-30}$ alkylene group, an optionally-substituted $C_{1-30}$ alkenylene group, an optionally-substituted $C_{3-30}$ alicyclic group, an optionally-substituted $C_{6-30}$ aromatic group or an optionally-substituted $C_{3-30}$ heteroaromatic group, said groups optionally including at least one bridging atom selected from the group consisting of O, N and S; $R^2$ independently represents an organic group comprising a polymerizable functional group which is branched or unbranched and selected from the group consisting of an alkene group, an alkyne group, a halogen group, a hydroxyl group, an ester group, a lactone group, a thiol group, a thioester group, an epoxy group, an amine group, and an isocyanate group; b represents an integer of 1 to 4; c represents an integer of 0 to 4; and d represents an integer of 0 to 4; OR (1 b) A-(X—Y—CO)$_m$(O—B—CO)$_n$OH, wherein A is a moiety containing a terminating ethylenic bond with one or more adjacent carbonyl groups; X is O and m is 1 to 4 or X is N and m is 1; Y is $C_{1-18}$-alkylene or $C_{2-18}$-alkenylene; B is $C_{2-6}$-alkylene; n is 0 to 5: provided that when A contains two carbonyl groups adjacent to the ethylenic group, X is N.

Embodiment [8] relates to the process of Embodiments [1]-[7], wherein: the metal carbonate comprises calcium carbonate; and the reactive compound is an unsaturated carboxylic acid or unsaturated carboxylic acid salt.

Embodiment [9] relates to the process of Embodiments [1]-[8], wherein the metal carbonate is calcium carbonate and the reactive compound is 9-decenoic acid.

Embodiment [10] relates to the process of Embodiments [1]-[9], wherein the reactive carbonate comprises a metal carbonate core at least partially covered by a layer of the reactive compound, such that the mineral binding group is bound directly to a surface of the metal carbonate core.

Embodiment [11] relates to the process of Embodiments [1]-[10], wherein the polymer matrix is selected from the group consisting of an acrylonitrile-butadiene rubber, hydrogenated acrylonitrile-butadiene rubber, an ethylene propylene diene rubber, a fluorocarbon rubber, a chloropropene rubber, a silicone rubber, a fluorosilicone rubber, a polyacrylate rubber, an ethylene acrylic rubber, a styrene-butadiene rubber, a polyester urethane rubber, a polyether urethane rubber, a polyester urethane polyether urethane rubber and a natural rubber.

Embodiment [12] relates to the process of Embodiments [1]-[11], comprising reacting a mixture containing the reactive carbonate and at least one prepolymer selected from the group consisting of a polyacrylate polymer, an ethylene-acrylate polymer, a polyester urethane, a bromo isobutylene isoprene polymer, a polybutadiene, a chloroisobutylene isoprene polymer, a polychloroprene, a chlorosulphonated polyethylene, an epichlorohydrin polymer, an ethylene propylene polymer, an ethylene propylene diene polymer, a polyether urethane, a fluorocarbon polymer, a fluorosilicone polymer, a hydrogenated nitrile butadiene polymer, a polyisoprene, an isobutylene isoprene butyl polymer, an acrylonitrile butadiene polymer, a polyurethane, a styrene-butadiene polymer, a styrene ethylene butylene styrene copolymer, a polysiloxane, a vinyl methyl silicone polymer, an acryonitrile butadiene carboxy polymer and a styrene butadiene carboxy polymer.

Embodiment [13] relates to the process of Embodiments [1]-[12], wherein the reacting occurs in the presence of at least one selected from the group consisting of water, an organic solvent, a dispersant, an inorganic filler, an organic filler, a pigment, an antioxidant, a wax, a radical initiator, a coupling agent and an impact modifier.

Embodiment [14] relates to the process of Embodiments [1]-[13], comprising reacting a vulcanizable elastomer in the presence of the reactive carbonate and a vulcanization agent to obtain a crosslinked, mineral-bound elastomeric composition.

Embodiment [15] relates to the process of Embodiments [1]-[14], wherein the reacting does not occur in the presence of a silane or silanol.

Embodiment [16] relates to the process of Embodiments [1]-[15], wherein the reacting of the monomer mixture, the prepolymer, or both, occurs in the presence of a non-reactive mineral selected from the group consisting of a non-reactive calcium carbonate, a talc, a diatomaceous earth, a clay and combinations thereof.

Embodiment [17] relates to the process of Embodiments [1]-[16], wherein a proportion of metal carbonate bound in the elastomeric composition ranges from about 0.1 to about 80, or from about 1 to about 50, or from about 5 to about 30, parts per 100 parts of the polymer matrix.

Embodiment [18] relates a mineral-bound elastomeric composition obtained by the process according to the process of Embodiments [1]-[17].

Embodiment [19] relates to an article comprising a mineral-bound elastomeric composition obtained by the process according to Embodiments [1]-[17].

Embodiment [20] relates to a mineral-bound elastomeric material, comprising: an elastic polymer; a polymer matrix unit comprising at least one connecting group and a mineral binding group; and inclusions of a metal carbonate bound to the polymer matrix unit via the mineral binding group, wherein the elastic polymer is covalently bound to the polymer matrix unit via the connecting group.

Embodiment [21] relates to the mineral-bound elastomeric material of Embodiment [20], wherein the elastic polymer is selected from the group consisting of an acrylonitrile-butadiene rubber, hydrogenated acrylonitrile-butadiene rubber, an ethylene propylene diene rubber, a fluorocarbon rubber, a chloropropene rubber, a silicone rubber, a fluorosilicone rubber, a polyacrylate rubber, an ethylene acrylic rubber, a styrene-butadiene rubber, a polyester urethane rubber, a polyether urethane rubber, a polyester urethane/polyether urethane rubber, and a natural rubber.

Embodiment [22] relates to the mineral-bound elastomeric material of Embodiment [20] and [21], wherein: the connecting group comprises a saturated or unsaturated organic group comprising 6 to 24 carbon atoms and optionally at least one atom selected from the group consisting of O, N, S and a halogen; and the organic group connects the elastic polymer to the mineral binding group.

Embodiment [23] relates to the mineral-bound elastomeric material of Embodiments [20]-[22], wherein the matrix unit comprises a group of formula (1a) or (1 b): (1a): $(R^2)_d$-$(L^2)_c$-$(R^1)_b$-$(L^1)$-X—Z, wherein: Z represents a hydrogen atom, a metal ion, or an ammonium ion; X represents a moiety selected from the group consisting of $CO_2$; $PO_3$, $PO_4$, $SO_3$, or $SO_4$ $L^1$ independently represents a $C_{1-30}$ alkyl group, branched alkyl group, a $C_{1-30}$ alkenyl group, a branched alkenyl group, a $C_{3-30}$ alicyclic group, a $C_{6-30}$ aromatic group or a $C_{3-30}$ heteroaromatic group, said groups optionally including at least one bridging atom selected from the group consisting of O, N and S; $R^1$ independently represents an organic group comprising a polymerizable functional group selected from the group consisting of an alkene group, an alkyne group, a halogen group, a hydroxyl group, an ester group, a lactone group, a thiol group, a thioester group, an epoxy group, an amine group, and an isocyanate group; $L^2$ independently represents an optionally-substituted $C_{1-30}$ alkylene group, an optionally-substituted $C_{1-30}$ alkenylene group, an optionally-substituted $C_{3-30}$ alicyclic group, an optionally-substituted $C_{6-30}$ aromatic group or an optionally-substituted $C_{3-30}$ heteroaromatic group, said groups optionally including at least one bridging atom selected from the group consisting of O, N and S; $R^2$ independently represents an organic group comprising a polymerizable functional group which is branched or unbranched and selected from the group consisting of an alkene group, an alkyne group, a halogen group, a hydroxyl group, an ester group, a lactone group, a thiol group, a thioester group, an epoxy group, an amine group, and an isocyanate group; b represents an integer of 1 to 4; c represents an integer of 0 to 4; and d represents an integer of 0 to 4; OR (1b) $A\text{-}(X\text{---}Y\text{---}CO)_m(O\text{---}B\text{---}CO)_n OH$, wherein A is a moiety containing a terminating ethylenic bond with one or more adjacent carbonyl groups; X is O and m is 1 to 4 or X is N and m is 1; Y is $C_{1-18}$-alkylene or $C_{2-18}$-alkenylene; B is $C_{2-6}$-alkylene;

n is 0 to 5: provided that when A contains two carbonyl groups adjacent to the ethylenic group, X is N.

Embodiment [24] relates to the mineral-bound elastomeric material of Embodiments [20]-[23], wherein the mineral binding group comprises a carboxylic acid or salt thereof.

Embodiment [25] relates to the mineral-bound elastomeric material of Embodiments [20]-[24], wherein the metal carbonate is an alkali metal carbonate or an alkaline earth metal carbonate.

Embodiment [26] relates to the mineral-bound elastomeric material of Embodiments [20]-[25], wherein the metal carbonate is calcium carbonate, and the mineral binding group is a carboxylic acid salt.

Embodiment [27] relates to the mineral-bound elastomeric material of Embodiments [20]-[26], wherein the inclusions of the metal carbonate satisfy at least one of the following conditions: (i) the inclusions comprise particles of the metal carbonate having a $d_{10}$ ranging from about 0.01 μm to about 2 μm; (ii) the inclusions comprise particles of the metal carbonate having a $d_{50}$ ranging from about 0.3 μm to about 5 μm; (iii) the inclusions comprise particles of the metal carbonate having a $d_{90}$ ranging from about 1 μm to about 10 μm; (iv) the inclusions comprise particles of the metal carbonate having a $d_{98}$ ranging from about 3 μm to about 15 μm; and (v) the inclusions comprise particles of the metal carbonate having a steepness factor ranging from about 20 to about 70.

Embodiment [28] relates to the mineral-bound elastomeric material of Embodiments [20]-[27], wherein a proportion of inclusions smaller than 0.1 μm is no more than about 5% by volume, relative to a total volume of the mineral-bound elastomeric material.

Embodiment [29] relates to the mineral-bound elastomeric material of Embodiments [20]-[28], further comprising at least one selected from the group consisting of water, an organic solvent, a dispersant, an inorganic filler, an organic filler, a pigment, an antioxidant, a wax and an impact modifier.

Embodiment [30] relates to the mineral-bound elastomeric material of Embodiments [20]-[29], wherein the polymer matrix unit comprises a plurality of linking groups.

Embodiment [31] relates to an article comprising the mineral-bound elastomeric material according to Embodiments [20]-[30].

Embodiment [32] relates to a protective glove comprising the mineral-bound elastomeric material according to Embodiments [20]-[30] as an elastic material that resists cavitation.

Embodiment [33] relates to a method for reducing cavitation in an elastomeric material, the method comprising performing a polymerization or crosslinking process in the presence of a reactive carbonate to obtain a mineral-bound elastomeric material, wherein: the reactive carbonate comprises a metal carbonate bound to a reactive compound comprising a mineral binding group and a polymer reactive group connected together by a linking group; and at least one of the following factors is controlled such that the mineral-bound elastomeric material experiences less cavitation compared to an elastomer obtained by performing the polymerization or crosslinking process in the presence of the metal carbonate without the reactive carbonate: (a) a proportion of the reactive carbonate present in the polymerization process; (b) a particle size of the metal carbonate in the reactive carbonate; (c) a structure of the mineral binding group; (d) a structure of the polymer reactive group; (e) a structure of the linking group; (f) a number of mineral binding groups contained in the reactive carbonate; and (g) a number of polymer reactive groups contained in the reactive carbonate.

Embodiment [34] relates to the method of Embodiment [33], comprising performing a crosslinking process in the presence of a reactive carbonate comprising calcium carbonate bound to a reactive compound comprising: a carboxylic acid salt as the mineral binding group; and an alkene group or an alkyne group as the polymer reactive group.

Embodiment [35] relates to the method of Embodiments [33] and [34], wherein the mineral-bound elastomeric material is formed by crosslinking an elastomer in the presence of the reactive carbonate and a vulcanization agent.

Embodiment [36] relates to the method of Embodiments [33]-[35], wherein the cavitation experienced by the mineral-bound elastomeric material is reduced by controlling at least one of the following factors: (e1) a number of carbon atoms in the linking group; (e2) a number of, or size of, organic branching groups contained in the linking group; and (g) a number of polymer reactive groups contained in the reactive carbonate.

Embodiment [37] relates to a reactive carbonate, comprising a metal carbonate bound to a reactive compound, wherein the reactive compound comprises a mineral binding group and a polymer reactive group connected together by a linking group.

Embodiment [38] relates to the reactive carbonate of Embodiment [37], wherein: the metal carbonate is an alkali metal carbonate or an alkaline earth metal carbonate; the mineral binding group is a carboxylic acid salt; the polymer reactive group is an alkene group or an alkyne group; and the linking group is an organic group comprising 6 to 24 carbon atoms.

Embodiment [39] relates to the reactive carbonate of Embodiments [37] and [38], wherein: the metal carbonate is calcium carbonate; and the reactive compound is 9-decenoic acid.

Embodiment [40] relates to the reactive carbonate of Embodiments [37]-[39], wherein the linking group is an organic group comprising at least one unsaturated bond.

Embodiment [41] relates to the reactive carbonate of Embodiments [37]-[40], wherein the linking group is an organic group comprising at least one unsaturated bond at a terminal end of the organic group.

Embodiment [42] relates to a composition, comprising: an elastomeric material; the reactive carbonate of Embodiments [37]-[41]; and optionally a crosslinking agent.

Various modifications to the embodiments disclosed herein will be readily apparent, and the generic principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein. In this regard, certain embodiments within the disclosure may not show every benefit of the present disclosure, considered broadly.

What is claimed is:

1. A mineral-bound elastomeric material, comprising:
an elastic polymer;
a polymer matrix unit comprising at least one connecting group and a mineral binding group; and
inclusions of a metal carbonate bound to the polymer matrix unit via the mineral binding group,
wherein the elastic polymer is covalently bound to the polymer matrix unit via the connecting group;
wherein the connecting group comprises a saturated or unsaturated organic group comprising 8 to 20 carbon atoms and at least one atom selected from a group consisting of O, N, S and a halogen, and the organic group connects the elastic polymer to the mineral binding group; and
wherein the mineral binding group is bound to the metal carbonate via a functional group selected from the group consisting of a carboxylic acid, a carboxylic acid salt, a carboxylic acid derivative, an anhydride, an anhydride derivative, a phosphate, a phosphate salt, a phosphate derivative, and a sulfonate.

2. The mineral-bound elastomeric material according to claim 1, wherein the metal carbonate has not been pretreated with a silane or silanol.

3. The mineral-bound elastomeric material according to claim 1, wherein the mineral-bound elastomeric material is produced using a polymer emulsion method.

4. The mineral-bound elastomeric material according to claim 1, wherein the material is in the form of a film having a thickness up to about 30 mm.

5. The mineral-bound elastomeric material according to claim 4, wherein the material resists cavitation, formation of defects, formation of pinholes, formation of tears, formation of ruptures, or formation of leaks.

6. The mineral-bound elastomeric material according to claim 1, wherein the elastic polymer is selected from the group consisting of an acrylonitrile-butadiene rubber, hydrogenated acrylonitrile-butadiene rubber, an ethylene propylene diene rubber, a fluorocarbon rubber, a chloropropene rubber, a silicone rubber, a fluorosilicone rubber, a polyacrylate rubber, an ethylene acrylic rubber, a styrene-butadiene rubber, a polyester urethane rubber, a polyether urethane rubber, a polyester urethane polyether urethane rubber, and a natural rubber.

7. The mineral-bound elastomeric material according to claim 1, wherein the mineral binding group comprises a carboxylic acid or salt thereof.

8. The mineral-reinforced elastomeric material according to claim 1, wherein the metal carbonate is an alkali metal carbonate or an alkaline earth metal carbonate.

9. The mineral-bound elastomeric material according to claim 1, wherein the metal carbonate is calcium carbonate, and the mineral binding group is a carboxylic acid salt.

10. The mineral-bound elastomeric material according to claim 1, wherein the inclusions of the metal carbonate satisfy at least one of the following conditions:
(i) the inclusions comprise particles of the metal carbonate having a d-10 ranging from about 0.01 µm to about 2 µm;
(ii) the inclusions comprise particles of the metal carbonate having a d50 ranging from about 50 nm to about 5 µm;
(iii) the inclusions comprise particles of the metal carbonate having a d90 ranging from about 1 µm to about 10 µm;
(iv) the inclusions comprise particles of the metal carbonate having a d98 ranging from about 3 µm to about 15 µm; and
(v) the inclusions comprise particles of the metal carbonate having a steepness factor ranging from about 20 to about 70.

11. The mineral-bound elastomeric material according to claim 1, further comprising at least one selected from the group consisting of water, an organic solvent, a dispersant, an inorganic filler, an organic filler, a pigment, an antioxidant, a wax and an impact modifier.

12. The mineral-bound elastomeric material according to claim 1, wherein the polymer matrix unit comprises a plurality of connecting groups.

13. The mineral-bound elastomeric material according to claim 1, wherein the connecting group comprises a saturated or unsaturated organic group comprising 9 to 15 carbon atoms.

* * * * *